United States Patent Office 3,442,994
Patented May 6, 1969

---

3,442,994
METHOD FOR MAKING CURVED CERAMIC PLATES
Wilbur F. Herbert, Wheatridge, Colo., assignor to Coors Porcelain Company, Golden, Colo., a corporation of Colorado
No Drawing. Filed Feb. 7, 1966, Ser. No. 525,330
Int. Cl. B28b *1/14;* C04b *35/18, 33/32*
U.S. Cl. 264—63                                          6 Claims

ABSTRACT OF THE DISCLOSURE

In accordance with this invention, a shaped ceramic article is manufactured by the steps of first forming to predetermined shape a self-sustaining body of raw ceramic batch material containing a temporary organic binder, bisque firing the body while maintaining it in the predetermined shape thereby to increase the bond strength of the body, and thereafter firing the body to sintering temperature while simultaneously reshaping it to the final desired shape. The method is particularly suited for the manufacture of curved armor plate and the like from alumina ceramics.

---

This invention relates to a method for manufacturing curved plates of tough dense ceramic and useful, for example, as armor plate for law enforcement personnel and others subjected to small arms fire and shrapnel.

It is known that certain ceramics are useful as armor plate in that with a thickness and therefore weight which does not exceed practical limits they have the ability to withstand penetration by small arms projectiles and shrapnel. Specifically, the ceramics useful for this purpose are of the high alumina type and having an extremely high density, upwards of 3.9 which approaches the theoretical density of alumina which is 4. The high alumina ceramics comprehend bodies of 100% alumina and bodies containing upwards of about 85% alumina together with a small amount or amounts of other oxides or mixed oxides which serve as mineralizers or fluxing ingredients and typical of which are silica, clay, the alkaline earth oxides, the alkaline metal oxides, magnesia, chromia and the like. Examples are: 85% alumina, 10% silica, 2% calcia, 3% magnesia; 94% alumina, 4% silica, 1% calcia, 1% magnesia. To process such compositions into fired ceramic bodies of extremely high uniform density, such as is required to attain the toughness and other characteristics required for armor plate, by far the preferred technique is to first form the shaped article of a highly and uniformly compacted uniform mixture of the ceramic powder ingredients plus an organic binder and then subsequently firing this compact to sintering temperature whereby the organic binder is vaporized or burns out and the ceramic sinters to provide the desired uniform high density. One of the difficulties in such a process is, however, that of maintaining the precise desired shape through the firing operation, particularly where large bodies are being made. Also, since considerable shrinkage occurs and must occur in the firing operation to provide the desired high density, there is the problem of assuring that the shrinkage is uniform throughout the body since with nonuniformity in shrinkage there is resultant nonuniformity in density in the fired body and such nonuniformity is fatal to the value of the body as armor plate. The larger the article being made the greater the problems, and for personnel armor plate the size must be large, as for example, for breast plates, thigh plates and the like. To add to the difficulties, such plates must be curved in order to conform to the chest, thigh etc. contours. The present invention solves the aforesaid problems and provides a method whereby large curved plates of uniform high density alumina ceramic can be manufactured simply and efficiently.

Briefly, the method of the present invention comprises the steps of first forming a flat plate of a compact mixture of ceramic and organic binder, bisque firing the flat plate at a temperature sufficient to remove the binder and to cause sufficient bonding of the ceramic to provide a self-sustaining porous plate, and then subsequently firing the bisque fired plate to sintering temperature while said plate is positioned in a curved mold having the curvature desired for the finished armor plate whereby the plate during the sintering thereof sags into curved conformity with the mold. By first bisque firing the plate while it is flat and then subsequently imparting the desired curvature during the sintering operation, excellent control can be accomplished in attaining the uniform high density and precise shape desired and with minimum scrap loss. Other features and advantages will be apparent from the following detailed description of a preferred embodiment of the invention.

As the first step in the preferred method, the powdered high alumina ceramic raw batch such as any of those mentioned above is mixed with paraffin wax-water emulsion to form a slurry which slurry is then spray-dried in accordance with the conventional spray-drying technique to form small wax bonded generally spherical particles of the ceramic powder. A mass of this wax bonded material is then placed in a large flexible rubber or the like generally cylindrical container which can be on the order of 50″ in diameter and 50″ in length, and the container filled with the material is then subjected to fluid pressure sufficient to compress the material into a self-sustaining large cylindrical billet having a uniform high density. Since there is considerable compaction during this operation the dimensions of the resultant billet will be considerably less than those of the filled flexible container prior to application of the fluid pressure. This compaction step by means of fluid pressure is well known in the art and is commonly referred to as isostatic molding. As the next step in the preferred process, round disc-shaped plates are cut from the wax bonded ceramic powder billet by means of a suitable mechanical cutting tool which cuts through the billet transverse to the longitudinal axis thereof. Each of the plates cut from the billet it is then dressed on the surfaces thereof to provide the smoothness desired. Next the smooth surfaced round plate is machined away at its edge portions as by applying a sand belt or other abrading tool thereto, to provide the peripheral shape desired. For a breast armor plate, for example, the shape desired might be generally trapezoidal.

It will be understood of course that other techniques can be used to form the organic bonded ceramic plates, for example by molding or casting the plates, one at a time, directly from the binder-ceramic raw batch mixture. Any of various organic binders can be used as well known in the art of manufacturing sintered ceramic articles. However, isostatic molding using paraffin wax or similar binder is preferred in that it best assures a highly compacted plate of uniform composition and density.

As the next step in the process the flat wax bonded plate formed to desired peripheral shape is bisque fired by heating to a temperature of about 900° C. to 1200° C. on about a three to six hour schedule. During this firing operation the plates are supported flat and hence there is no change in shape although there is some shrinkage. The wax binder burns or vaporizes out during the early part of the bisque firing operation and the resultant flat plates are quite porous but have good strength, amply sufficient to prevent breakage during subsequent handling operations, by way of the ceramic bonding which occurs during the firing.

Next the bisque fired flat plate is positioned with peripheral portions resting on peripheral portions of a high temperature resistant ceromic concave mold having the curvature desired for the finished ceramic armor plate. This mold with the plate positioned thereon is then placed or passed into a kiln where the plate is heated to sintering temperature, on the order of 1400° C. to 1700° C. for about six to eight hours. The temperatures and times required for the sintering of high alumina ceramics are of course well known in the art. During the sintering operation the plate sags into conformity with the mold whereby the desired curvature is imparted and the ceramic sinters to a dense non-porous body. The peripheral shape of the plate remains the same though there is considerable shrinkage with resultant densification. Upon cooling, manufacture of the plate is complete.

By way of the bisque firing operation excellent control can be maintained to assure the desired shape and curvature and to assure an optimum uniform high density finished product, and yet with minimum hazard of breakage or other loss during manufacture. The plates can be manufactured to any curvature desired. For example, either uniform curvature or varying curvatures in different parts of the plate can be imparted. The curvature can either be simple or compound. A convex rather than a concave mold can be used if desired though except in a situation where a center portion of the plate is desired to be generally flat, a concave mold is much preferred since it simplifies proper positioning of the flat plate on the mold at the commencement of the sintering operation.

Hence it will be understood that whereas the invention has been described specifically with reference to a preferred embodiment thereof, various changes and modifications may be made all within the full and intended scope of the claims which follow.

The embodiments of the invention in which exclusive property or privilege is claimed are defined as follows:

1. A method for manufacturing a ceramic article comprising the steps of forming from a ceramic batch and a temporary organic binder a self-sustaining body of predetermined shape, bisque firing said body while maintaining it substantially in said predetermined shape thereby to provide a porous ceramic body of substantially said predetermined shape having increased bond strength, and thereafter firing said porous body to sintering temperature while simultaneously reshaping said body thereby to provide a dense non-porous sintered ceramic article of the shape desired.

2. A method as set forth in claim 1 wherein the body formed from said ceramic batch is a flat plate and wherein said reshaping is accomplished by positioning the plate, after the bisque firing thereof, on a curved mold whereby the plate sags into conformity with the curved mold during the sintering step.

3. A method as set forth in claim 1 wherein said ceramic raw batch contains at least about 85% by weight aluminum oxide.

4. A method as set forth in claim 3 wherein said bisque firing is at a temperature of about 900° to 1200° and said sintering is at a temperature of about 1400° to 1700°.

5. A method as set forth in claim 1 wherein the initial body is formed by subjecting to fluid pressure a uniform mixture of organic wax binder and said ceramic raw batch material to thereby compact said mixture, said wax binder being removed from the plate during said bisque firing.

6. A method as set forth in claim 5 wherein said mixture is compacted by said fluid pressure into a billet, after which the body is cut from said billet.

References Cited
UNITED STATES PATENTS

| | | | |
|---|---|---|---|
| 1,527,874 | 2/1925 | Hood | 264—63 |
| 2,883,729 | 4/1959 | Akira Ito | 264—57 |
| 2,968,551 | 1/1961 | North et al. | 264—63 |
| 3,030,228 | 4/1962 | Hernandez et al. | 264—63 |
| 3,274,311 | 9/1966 | Watson et al. | 264—63 |

DONALD J. ARNOLD, *Primary Examiner.*

U.S. Cl. X.R.

264—57, 66